(12) United States Patent
Ittycheriah et al.

(10) Patent No.: US 6,580,814 B1
(45) Date of Patent: Jun. 17, 2003

(54) SYSTEM AND METHOD FOR COMPRESSING BIOMETRIC MODELS

(75) Inventors: Abraham P. Ittycheriah, Danbury, CT (US); Stephane H. Maes, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/126,894

(22) Filed: Jul. 31, 1998

(51) Int. Cl.⁷ .................................................. G06K 9/00
(52) U.S. Cl. ........................ 382/115; 340/5.52; 704/238
(58) Field of Search ................................. 382/115, 119, 382/120; 704/221, 222, 230, 231, 236, 237, 238, 239, 243, 245, 247, 250, 500, 246, 273; 235/380; 340/5.1–5.92, 5.8–5.86; 73/865.4

(56) References Cited

U.S. PATENT DOCUMENTS

| | | | | |
|---|---|---|---|---|
| 5,787,394 A | * | 7/1998 | Bahl et al. | 704/238 |
| 5,799,088 A | * | 8/1998 | Raike | 380/30 |
| 5,812,739 A | * | 9/1998 | Hirayama | 704/238 |
| 6,073,096 A | * | 6/2000 | Gao et al. | 704/245 |
| 6,073,101 A | * | 6/2000 | Maes | 704/275 |

FOREIGN PATENT DOCUMENTS

| | | | |
|---|---|---|---|
| JP | 2-162400 | * | 6/1990 |
| JP | 02-162400 | * | 6/1990 |

* cited by examiner

*Primary Examiner*—Samir Ahmed
(74) *Attorney, Agent, or Firm*—F. Chau & Associates, LLP

(57) ABSTRACT

A system and method for building compressed biometric models and performing biometric identification using such models. The use of the compressed biometric models results in a significant decrease in the storage requirements for biometric models in conventional biometric systems. A given number of L reference biometric models are built. The L reference models are randomly divided into M subsets. During user enrollment, distance measurements between a temporary biometric model and each of the reference models in the M subsets are computed. The rank and distance parameters are used to build the compressed biometric models in accordance with the model: $I(M_j, R_i, D(M_j, R_i))$, where I represents the identity of the closest reference model in a corresponding subset $M_j$; $R_i$ refers to the ranking of the closeness of the reference model to the temporary biometric model as compared with the closeness of each of the other reference models in the corresponding subset $M_j$; and D refers to the corresponding distance measure between the reference model and the temporary biometric model.

29 Claims, 6 Drawing Sheets

SYSTEM AND METHOD FOR COMPRESSING BIOMETRIC MODELS

BACKGROUND

1. Technical Field

The present application relates generally to biometric systems and, in particular, to a system and method for building compressed biometric models for each enrolled user in a biometric system, whereby the compressed biometric models are stored in an engine database of the biometric system rather than full biometric models.

2. Description of Related Art

Conventional biometric systems generally operate by storing full biometric models (e.g. codebooks) for each enrolled user of the system (i.e., the entire population of persons to be recognized by the biometric system). These models can be built, for example, from statistical data such as Gaussian distribution data which is computed from a collection of feature vectors that are generated during a biometric feature extraction process. The conventional biometric systems generally perform user identification or verification by comparing the distances between a temporary biometric model (or feature vectors), which is generated for an individual making an identity claim, with training models of enrolled users (that are previously built and stored during an enrollment process) and finding the training model having the shortest distance from the temporary biometric model (or feature vectors).

The problem with these conventional biometric systems, however, is that the storage requirements for the biometric training models becomes significant when the system is trained to recognize and verify a large population. There is a need, therefore, for a system and method for building compressed biometric models for enrolled users which reduce the storage requirements of the biometric system without affecting or reducing the ability of the biometric system to perform accurate biometric identification/verification.

SUMMARY

The present application is directed to a system and method for building compressed biometric models. A compressed biometric model for each enrolled user is constructed from rank and distance parameters which are derived by computing the distance between a temporary biometric model (which is built from biometric data provided by the user) and a plurality of biometric reference models which are stored in the engine database of the biometric system. The plurality of biometric reference models consist of a set of conventional biometric models (i.e., not compressed) for a given number L of randomly chosen individuals, which are generated prior to user enrollment. The L reference models are randomly divided into M subsets.

During enrollment, a temporary biometric model of a given user is compared with the reference models in each of the M subsets so as to score rank and distance values. The rank and distance parameters are used to build the compressed biometric models in accordance with the following model:

$$\Sigma I(M_j, R_i, D(M_j, R_i)) = \{[I(M_1, R_1, D(M_1, R_1)), \ldots, I(M_1, R_i, D(M_1, R_i))], \ldots, [I(M_j, R_1, D(M_j, R_1)), \ldots, I(M_j, R_i, D(M_j, R_i))]\}$$

where I represents the identity of the closest reference model in a corresponding subset $M_j$; $R_i$ refers to the ranking of the closeness of the reference model to the temporary biometric model as compared with the closeness of each of the other reference models in the corresponding subset $M_j$; and D refers to the corresponding distance measure between the reference model and the temporary biometric model.

The compressed biometric models are then stored in the engine database rather than storing the full (i.e., temporary biometric models) that are initially created during user enrollment. Consequently, by not having to store the full biometric models for each enrolled user, the storage requirements of the biometric system may be significantly reduced.

These and other objects, features and advantages of the present system and method will become apparent from the following detailed description of illustrative embodiments, which is to be read in connection with the accompanying drawings.

DETAILED DESCRIPTION OF PREFERRED EMBODIMENTS

It is to be understood that the present system and method for building compressed biometric models described herein may be implemented in any conventional biometric system (e.g., handwriting and speech) and is not, in any way, limited to use with or dependent on any details or methodologies of any particular biometric system. The preferred biometric system in which the present system and method for biometric model compression may be implemented is the text-independent speaker verification system based on frame-by-frame feature classification as disclosed in detail in U.S. Ser. No. 08/788,471 entitled: "Text Independent Speaker Recognition for Transparent Command Ambiguity Resolution And Continuous Access Control," which is commonly assigned to the present assignee and the disclosure of which is incorporated herein by reference. In the following description of preferred embodiments, various aspects of the above-incorporated U.S. Ser. No. 08/788,471 will be referenced and discussed in detail to illustrate the present system and method for biometric model compression as it applies to speaker recognition.

Figure 1:
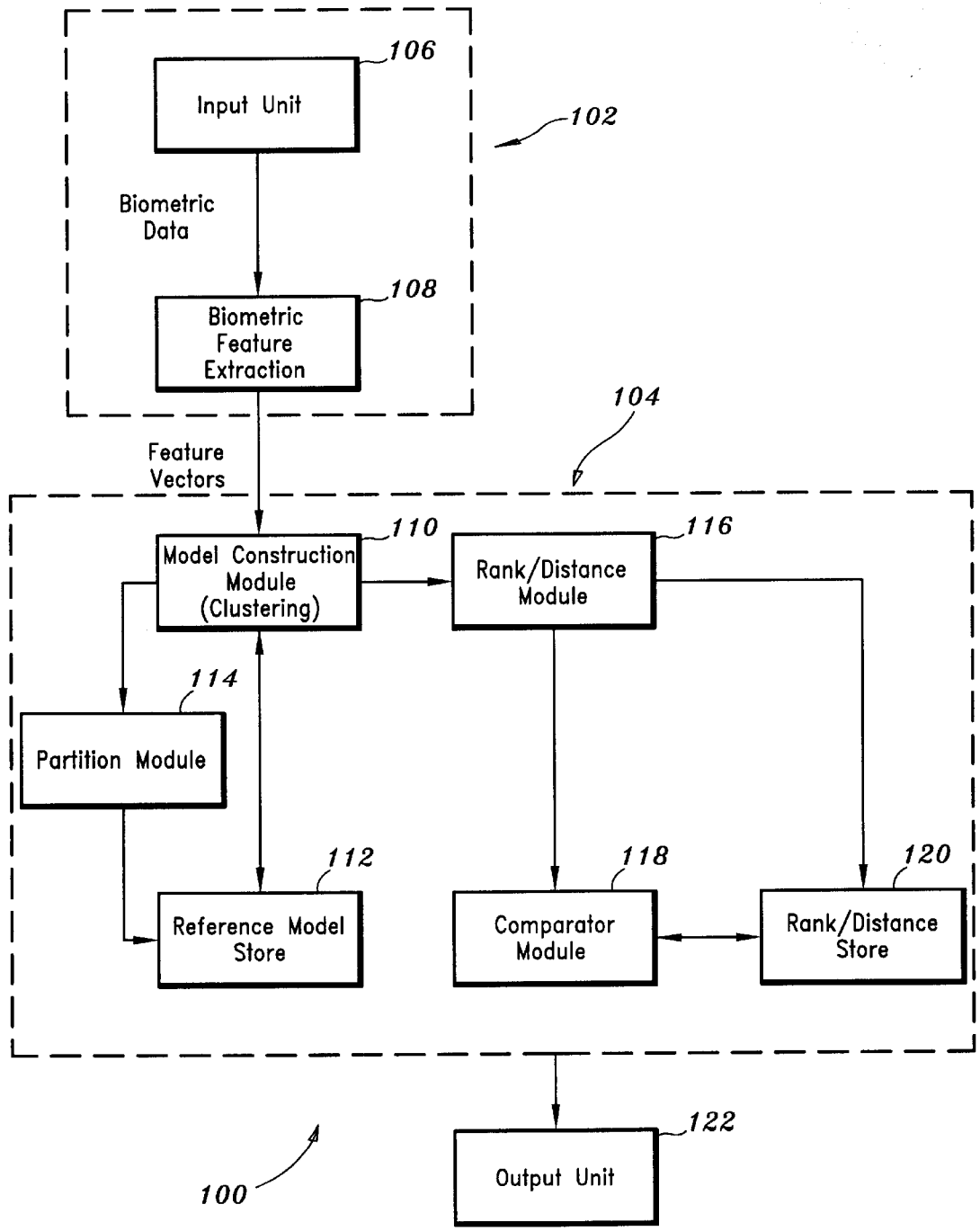
FIG. 1 is a block diagram of a system for providing biometric model compression in a biometric system in accordance with a first embodiment.

Referring now to FIG. 1, a block diagram of a biometric system for providing biometric model compression in accordance with a first embodiment is shown. In general, the biometric system 100 includes a biometric front end 102, a biometric processing unit 104 and an output unit 122. The biometric front end 102 includes an input unit 106 and biometric feature extraction module 108. The input unit 106 receives biometric data and converts such data into electrical signals. The input unit 106 can be any conventional device suitable for receiving the associated biometric data such as a microphone for receiving speech utterances. The biometric feature extraction module 108 receives the biometric data from the input unit 106 and generates feature data (e.g., feature vectors). In the preferred text-independent speaker recognition embodiment, the biometric feature extraction module 108 processes digitized speech utterances in successive time intervals to generate a sequence of acoustic feature vectors in a manner understood by those skilled in the art.

The biometric processing unit 104 includes a model construction module 110 (or "clustering module"), operatively connected to the biometric feature extraction module 108, for generating reference biometric models and temporary biometric models and for computing distance data which is used to construct compressed biometric models of the present system (as discussed in further detail below). In the preferred text-independent speaker recognition system, the model construction module 110 is implemented as a vector quantizer module which quantizes (i.e., clusters) continuous valued feature vectors (generated by speech utterances from a user) into a plurality of "codewords" which are used to construct a "codebook" (i.e., biometric model) in a manner understood by those skilled in the art.

A partition module 114, operatively connected to the model construction module 110, divides a given number of L reference models (generated by the model construction module 11 during a pre-enrollment process) into M subsets. A reference model store 112 is connected to the model construction module 110 for storing the L reference models (e.g., codebooks) in the partitioned format. As discussed in detail below, this partition format for the L reference models provides the basis for constructing compressed biometric models. It is to be understood that, as explained in further detail below, the selection of the reference population and selection of the corresponding clusters (i.e., reference models) are done in advance of user enrollment (i.e., building compressed biometric models for the users). In an extreme case, this process can be performed after user enrollment. During biometric recognition, however, the clusters are known and fixed at the server of the access provider.

A rank/distance module 116 processes the distance data provided by the model construction module 110, identifies the closest reference model or ranks the R closest reference models in each of the subsets M and builds the compressed biometric models based on the identity and ranking and/or distance parameters. A rank/distance store 120 receives and stores the compressed biometric models.

A comparator module 118, operatively connected between the rank/distance module 116 and the rank/distance store 120, operates during a biometric verification process by comparing a compressed biometric model (which is temporarily generated for an individual making an identity claim) with each of the compressed biometric models stored in the rank/distance store 120. User verification will be found if a match is found between the temporary compressed biometric pattern matches and any of the stored compressed biometric patterns.

An output unit 122 (e.g., a monitor with an associated GUI menu or the like), operatively connected to the biometric processing unit 104, allows a user to interact with the biometric system such as during enrollment to advise the user whether or not enrollment has been successfully executed, or during biometric recognition to advise a person whether or not his/her identity has been successfully verified. By way of example, the output unit 122 may be configured to provide an indication of whether or not the biometric system 100 has received an adequate amount of biometric data for proper identification. The output unit 122 may be any conventional device such as a display monitor, an indicator, a speech synthesizer or a printer.

It is to be understood that the system and methods described herein may be implemented in various forms of hardware, software, firmware, or a combination thereof. Specifically, the biometric feature extraction module 108, the model construction module 110, the partition module 114, the rank/distance module 116 and the comparator module 118 described above are preferably implemented in software and may comprise any suitable and preferred processor architecture for practicing the invention by programming one or more general purpose processors. It is to be further understood that, because these components can be implemented in software, the actual connections shown in the FIG. 1 may differ depending upon the manner in which the system is programmed. Of course, special purpose processors may be employed to configure the present system. Given the teachings herein, one of ordinary skill in the related art will be able to contemplate these and similar configurations for the present system.

Further, the reference model store 112 and the rank/distance store 120 may be electronic computer read/write memory or any other suitable memory. Preferably, the present system is implemented on a computer platform in application domains such as a desktop, client-server environment, an embedded system and a telephony environment.

Pre-Enrollment: Training and Partitioning Reference Models

Figure 2:
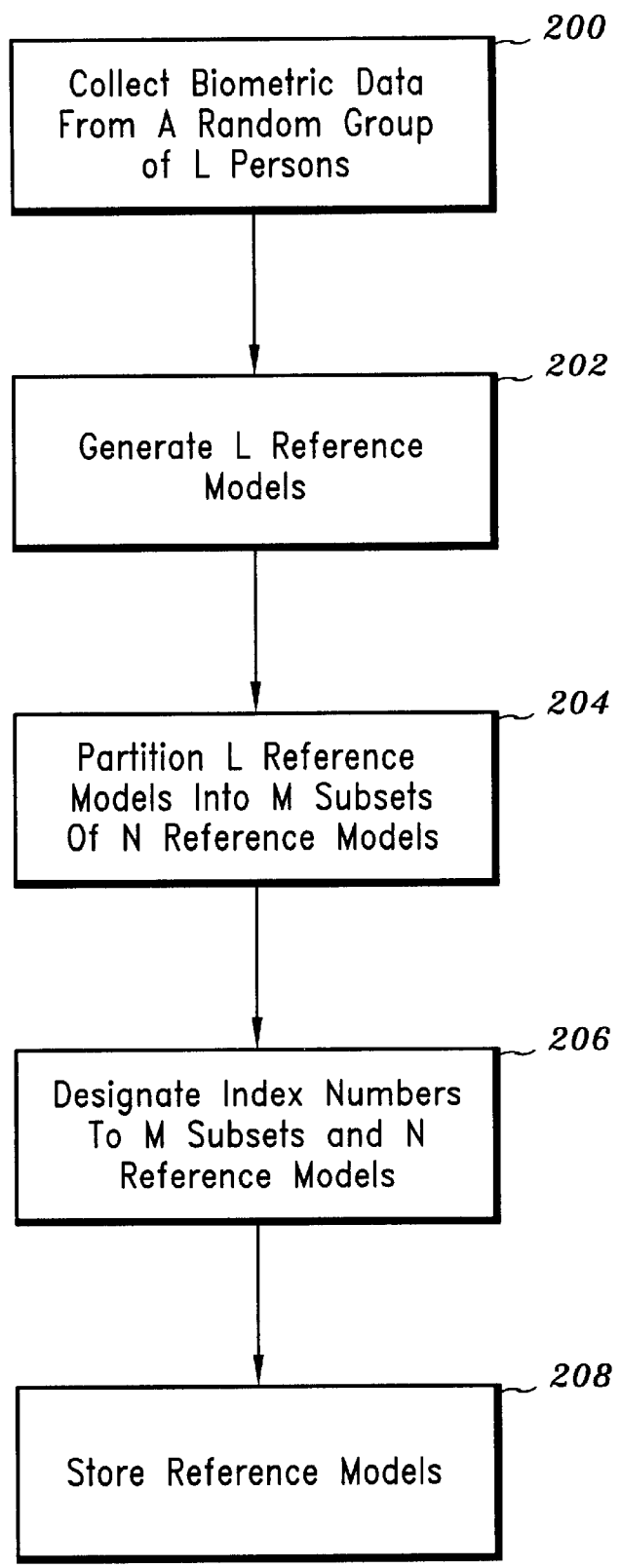
FIG. 2 is flow diagram illustrating a method for generating reference models in accordance with one aspect of the present system.

As indicated above, prior to building the compressed biometric models, a given number "L" of random reference models must first be constructed and stored in the system (i.e., a reference biometric model must be generated for each person of a random group of L individuals). Referring now to FIG. 2, a method for training and partitioning L reference models in accordance with one aspect of the present system is shown. Initially, biometric data is collected from a random group of L persons and processed by the biometric front end 102 to generate L sets of feature vectors, one set corresponding to each individual in the random group (step 200). Each set of feature vectors is processed by the model construction module 110 to generate a reference model for each of the L reference individuals (step 202).

For instance, in accordance with the preferred text independent speaker recognition system described in U.S. Ser. No. 08/788,471, biometric data (in the form of input utterances) from each person of a random group L reference speakers is converted into feature vectors which are clustered into approximately 65 codewords which are used to construct a reference model (i.e., codebook) for each of the L reference speakers under the operation of a vector quantization module. These feature vectors are preferably computed on overlapping 30 msec frames with shifts of 10 msec, and typically requiring approximately 10 seconds of speech to enroll each reference speaker L.

Referring again to FIG. 2, the L reference models (e.g., codebooks) are then partitioned into M subsets, each of the M subsets having a certain number N of reference models associated therewith (step 204). An index number is designated to each of the M subsets, i.e., $M_j$ where j=1 . . . total # of subsets. Further, each reference model N in a corresponding M subset is designated with an index number, i.e., $N_k$, where k=1 . . . total number of reference models in the corresponding M subset (step 206). The indexed subsets $M_j$ and their corresponding indexed reference models $N_k$ are then stored in the reference model store 112 (step 208).

Figure 3:
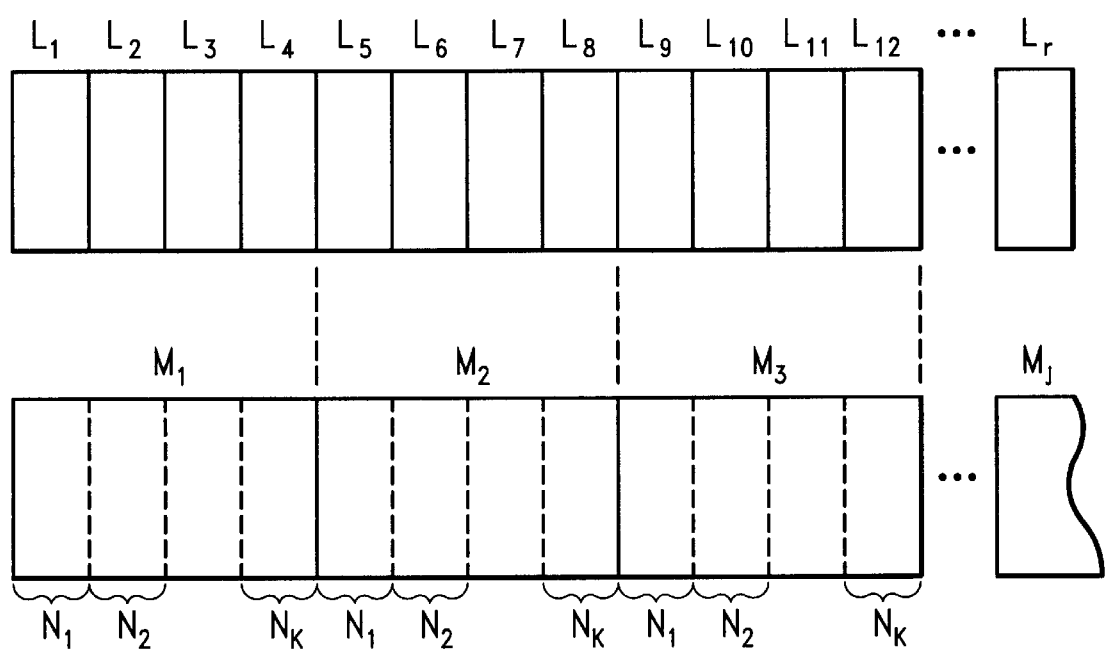
FIG. 3 is a diagram illustrating an example for partitioning reference models in accordance with one aspect the present system.

FIG. 3 is a diagram which illustrates an example for a partition structure for the L reference models in accordance with one aspect of the present system. As shown in FIG. 3 by way of example, L reference models L (i.e., $L_1$–$L_r$) are partitioned into $M_j$ subsets with each $M_j$ subset having 4 reference models associated therewith. It is to be understood that the number of reference models L that can be utilized is based on task specific factors and can be determined on a trial-by-trial basis for each biometric system. These factors include, for example, the available storage space of the biometric system (since the L reference models are full biometric models) and the size of the population to be recognized.

It is to be further understood that the number of subsets M into which the totality of L reference model are divided is random and not important to the implementation and practice of the present invention. Given that there are N reference models for each of the M subsets and that the total number L reference models is equal to the total N models of all M subsets, it is preferable that N and M be chosen such that $N^M$ be much greater than the size of the population to be recognized (i.e., $N^M$>>> size of enrolled users).

User Enrollment:Construction of Compressed Models

Figure 4:
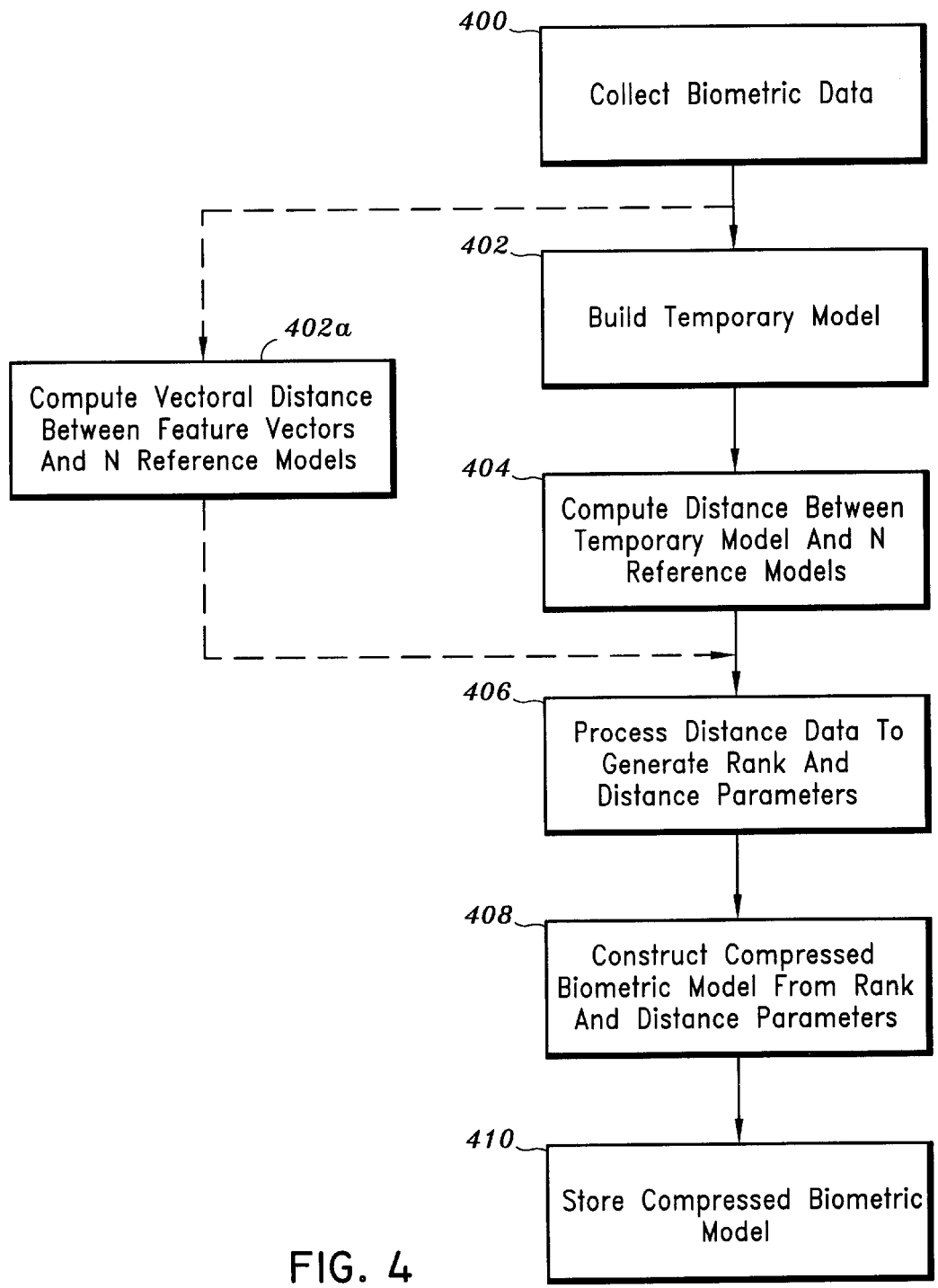
FIG. 4 is a flow diagram illustrating a method for building compressed biometric models in accordance with one aspect of the present system.

After the L reference models are partitioned (as discussed above), a user is enrolled by building and storing his/her corresponding compressed biometric model. Referring now to FIG. 4, a flow diagram illustrates a method for building compressed biometric models in accordance with one aspect of the present system. During enrollment, biometric data is collected for an authorized user and processed by the biometric front end 102 (step 400) in a manner similar to that described above for the creation of the L reference models. The resulting feature vectors are processed by the model construction module 110 to build a temporary biometric model for the user (step 402). The model construction module 110 then computes the distance between the temporary biometric model and each of the reference models in each M subset (step 404). For example, in the preferred text-independent speaker recognition embodiment, for each of the M subsets of reference codebooks (models), the vector quantizer (model construction module 110) computes the distance between the distributions (i.e., the mean values and variances of the cluster of feature vectors which are represented as codewords) of the temporary biometric codebook with the distributions of each of the N reference codebooks constituting each of the M subsets stored in the reference model store 112.

It is to be understood that any conventional method for computing the distance measure between the distributions of the temporary biometric model and the distributions of the N models may be implemented in the present method such as the Euclidean, Mahalanobis and Kullback-Leibler methods. It is also understood that these methods for computing distances are typically used for biometric systems in which Gaussian mixtures are utilized (such as speaker recognition). For other biometric systems, however, the distance between the biometrics (or models) will be expressed differently.

The computed distance measurements are then processed by the rank/distance module 116 to generate the rank and distance parameters which are used to build the compressed biometric models of the present system (step 406). Specifically, from the distance measurements, the rank/distance module 116 identifies the closest reference model, or ranks the R closest reference models in each of the M subsets. The identity of the closest and/or ranked reference models and their corresponding distance values are then used to build the compressed biometric models (step 408) in accordance with the following model:

$$I(M_j, R_i, D(M_j, R_i));$$

where I represents the identity of the reference model $N_k$ with its corresponding ranking value $R_i$ for the corresponding subset $M_j$ and D represents the distance measure corresponding to the identified reference model $I(M_j, R_i)$. In particular, $R_i$ is the ranking of the closeness of the reference model to the temporary biometric model (based on the computed distance information) as compared to each of the remaining reference models in the corresponding subset $M_j$. For example, the rank/distance module 116 will designate a first-rank score (e.g. $R_1$) to the reference model $N_k$ having the closest measured distance to the temporary biometric model, a second-rank score (e.g., $R_2$) to the N model having the second closest distance to the user model, and so on.

It is to be appreciated that the present biometric system 100 can be preprogrammed to identify only the closest reference model in each of the M subsets (if no ranking pattern is desired) or identify the $R_i$ closest reference models for each of the M subsets (i.e. i>1) if a ranking pattern is desired). Each of the biometric models is then stored in the rank/distance store 120 (step 410).

Alternatively, the compressed biometric model may be built by directly processing the features vectors generated from the biometric data from a user during enrollment (as opposed to building a temporary user model and computing distance measure between user model and the N models as discussed above). For instance, in the preferred text-independent speaker recognition system, a vector quantizer (which functions similarly to the model construction module 110) may evaluate speech utterances on a frame-by-frame basis by computing the vectorial distance between the feature vectors for each frame with each of the reference codebooks in the M subsets using methods known to those skilled in the art (step 402*a*). These distance computations are then processed by the rank/distance module 116 (step 406), whereby a histogram is created which counts how many frames of speech have selected each of the N codebooks (for each of the M subsets). The identity of the reference codebook in each M subset which is most often selected, or the identity of the R closest reference codebooks in each M subset which are most often selected, may then be used to generate a compressed biometric model for the user in the same manner as discussed above (step 408). The distance component D of the compressed biometric model is derived by calculating the average vectorial distance between the feature vectors associated with the closest identified reference codebook(s).

It is to be understood that compressed biometric models which are built solely from the identity of the closest reference model in each M subset (i.e., no ranking utilized) or from the R closest reference models in each M subset (i.e., ranking utilized) is sufficient to obtain accurate user identification in biometric systems that are employed to recognize either a small population or an exclusive set of enrolled users where it can be guaranteed that no two enrolled users share the same biometric pattern. Indeed, if the compressed biometric models are built from ranking patterns alone (i.e., $R_i$ where i=1 or i>1), such models would have to be tested after enrollment to determine that no two similar signatures exist for any of the enrolled users. It is to be further understood that when employed in a large population, it is preferable for the compressed biometric models of the present system to be built from ranking data and distance data so the biometric system can perform accurate user identification and verification over a large population. Specifically, when a large population of users are enrolled in the biometric system, the probability of two or more enrolled users having the same biometric pattern increases, thereby requiring the inclusion of the distance component of the compressed biometric models so as to provide accurate user verification.

Figure 5:
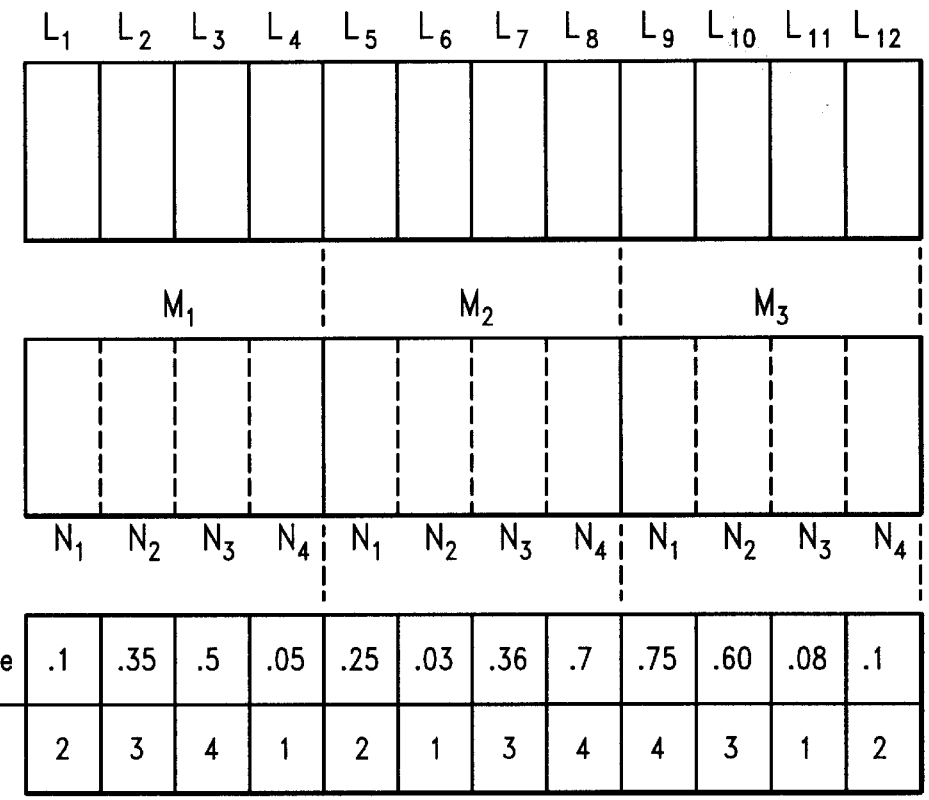
FIG. 5 is a diagram illustrating structures of compressed biometric models in accordance with one aspect of the present system.

Referring now to FIG. 5 a diagram illustrating the structure of a compressed biometric model in accordance with one aspect of the present system is shown. By way of example, using the partition structure shown in FIG. 3, assume that the biometric system 100 is programmed to generate models with a ranking Ri where i=(1,2). Assume further $L_r$ where r=(1–12), $M_j$ where j=1–3) and $N_k$ where k=(1–4). Assume further that distance values shown represent the distance measures computed during user enrollment between the temporary biometric model and the corresponding reference models $N_k$ (or that the feature vectors are one-dimensional, thereby providing a single distance value). As shown in FIG. 5, the distance measurements between the temporary biometric model (or the average distance value of the feature vectors) and the reference models (i.e., $N_1-N_4$) for each of the subsets $M_1$, $M_2$ and $M_3$ are used to rank the N reference models. With the distance values and ranking information, biometric models can be created as shown in FIG. 5. In particular, assuming that the biometric system 100 is programmed to construct the compressed biometric patterns by using the identity of the closest ranked reference models $I(M_j, R_i)$, the resulting compressed biometric model would have the pattern shown in Model 1. Moreover, assuming that the system is programmed to build compressed biometric models with both the identification I and distance D components $I(M_j, R_i, D(M_j, R_i))$, the resulting biometric model would have the pattern shown in Model 2.

Identification and Verification of Enrolled Users

Figure 6:
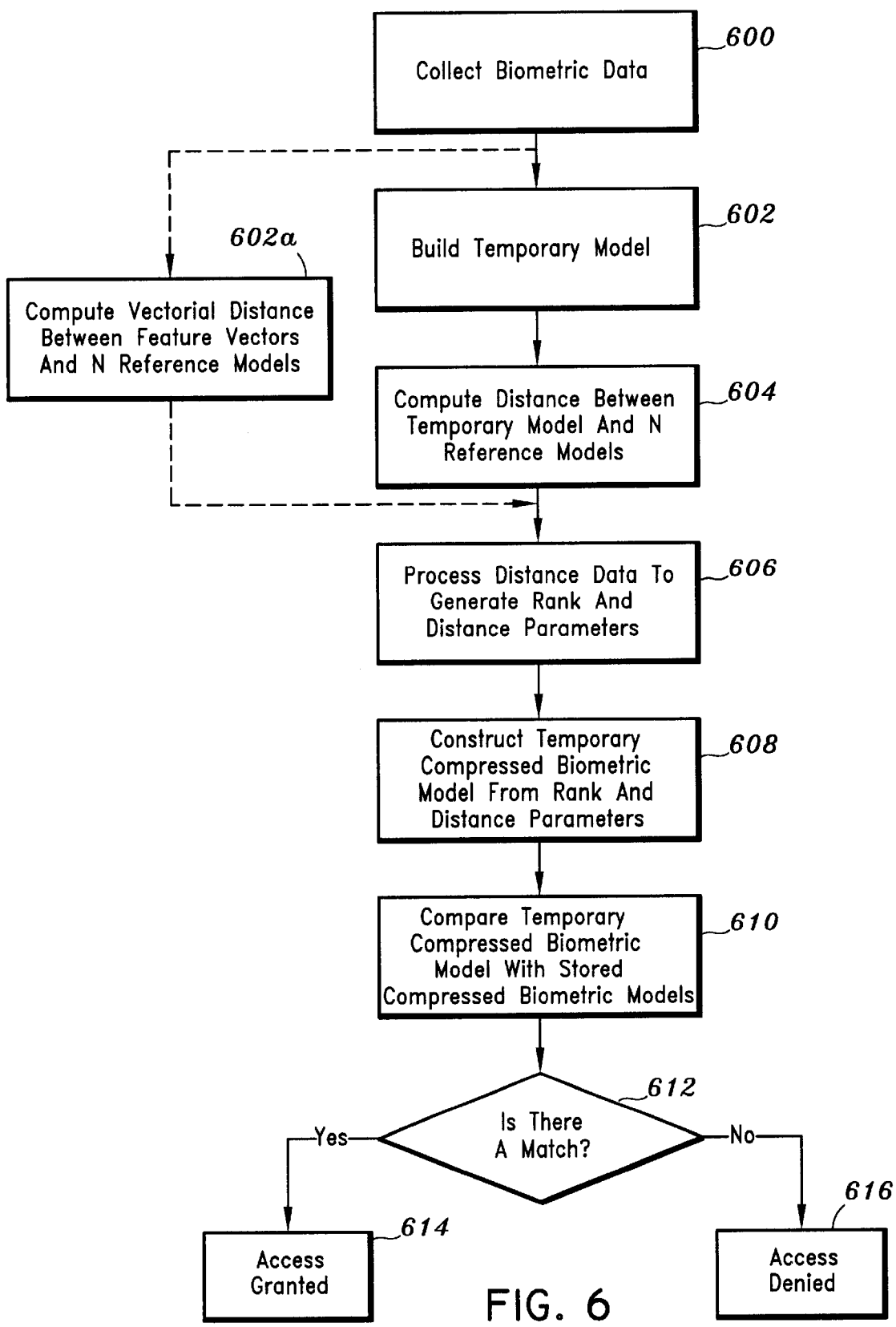
FIG. 6 is a flow diagram illustrating a method for biometric identification/verification utilizing the compressed biometric models in accordance with one aspect of the present system.

Referring now to FIG. 6, a flow diagram illustrating a method for user identification and verification utilizing the compressed biometric models in accordance with one aspect of the present system is shown. During the identification/verification phase, biometric data is provided by a person making an identity claim (step 600) and a temporary biometric model is built (step 602). The distance between the temporary biometric model and each of the reference models in the M subsets is computed (step 604). This distance information is then processed by the rank/distance module 116 to generate the rank and distance parameters (step 606). These parameters are then used to build a temporary compressed biometric model (i.e., biometric pattern $I(M_j, R_i, D(M_j, R_i))$) in the same manner as discussed above (step 608). The comparator module 118 compares the temporary compressed biometric pattern with the biometric models (generated during user enrollment) stored in the rank/distance store 120 (step 610). If the comparator module 118 finds a match between the temporary compressed biometric model and one of the compressed biometric models in the rank/distance store 120 (positive result in step 612), the user will be granted access to the system which is protected by the biometric recognition system 100 (step 612). If on the other hand the comparator module 118 does not find a match (negative result in step 612), the user will be denied access (step 616).

It is to be appreciated that the system may be programmed with user-specified tolerances that are utilized by the comparator module 118 during the matching process. For example, for verification purposes, the allowable tolerances for the difference between the distance component (assuming a match for the identity component) of the temporary compressed biometric model and a stored compressed biometric model is programmable parameters. The allowable tolerance is essentially a function of the particular application and can be determined heuristically, by trial and error.

Alternatively, in the case of the preferred text-independent speaker recognition method, speaker identification may be performed on a frame-by-frame basis as described above. Particularly, the temporary compressed biometric model (which is constructed and compared with the stored biometric models) may be built by processing the features vectors generated from the input utterances of the person making an identity claim (as opposed to building a temporary biometric model and computing distance measure between the temporary model and the reference models as discussed above). Specifically, a vector quantizer can be implemented to evaluate the speech utterances of the speaker on a frame-by-frame basis by computing the distance between the feature vectors for each frame with each of the reference models in each subset M using methods known to those skilled in the art (indicated by the dotted line to step 602a). These distance computations are then processed by the rank/distance module 116, whereby a histogram is created which counts how many frames of speech have selected each of the N models (for each of the M subsets). The identity I of the reference model in each M subset which is most often selected, or the identity I of the R closest reference models in each subset M which are most often selected, may then be used to generate a compressed biometric model for the user in the same manner as discussed above (step 608). Moreover, the distance component D of the compressed biometric model is derived by calculating the average vectorial distance between the feature vectors associated with the closest N model(s).

There are several advantages associated with utilizing the compressed biometric models described herein. For instance, the compressed biometric models may be used in any biometric system to obtain accurate identification over a large population. In addition, the compressed biometric models are well adapted for use in portable systems such as magnetic cards, smartcards or a personal digital assistant (PDA) where the storage space may be limited. Moreover, since the biometric models are essentially "hidden" in a compressed representation, a hacker or thief who unlawfully obtains the PDA or smartcard to extract and read the bioprints will have extreme difficulty trying to decipher the compressed representation, as he/she would need access to the original set of biometric models which are typically not distributed.

Furthermore, the compressed biometric models of the present system provide a significantly high level of stability and reproducibility such that these models may be employed as keys for unlocking secure applications or encrypting and decrypting files. Indeed, experiments have shown that the compressed biometric models (i.e., bioprint patterns) described herein can be consistently reproduced for a given user even with non-reproducible biometrics such as voiceprints. Accordingly, these compressed models can be used as keys for unlocking secure applications or encrypting and decrypting files. In addition, the compressed biometric models may be utilized as keys to unlock the key used to decrypt a message.

By way of example, assume that a given biometric system uses a compressed biometric model representation having $M_j$ (j=1–128), $N_k$ (k=1–2), $R_i$ (i=1) and each reference model $N_k$ in the corresponding subset $M_j$ is indexed as either a 0 or 1. Assume further that a key (i.e., encryption and/or decryption key) is represented by a sequence of 128 binary 0s and 1s. Since R=1 and the closest identified reference model N for each of the 128 subsets M is represented by 0 or 1, the compressed biometric model in this example will be represented by a sequence of 0s and 1s 128 bits in length. Therefore, if the binary sequence of the key used to decrypt a certain file or provide access to a secured application matches the binary sequence of the compressed biometric model, then a person can obtain the key by being identified by the biometric system.

Although the illustrative embodiments of the present system and method have been described herein with reference to the accompanying drawings, it is to be understood that the present system and method are not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A system for compressing biometric models, comprising:
   means for receiving and processing biometric data from a plurality of reference individuals to generate a reference biometric model for each of said plurality of reference individuals and from at least one user of said system to generate a temporary biometric model for said user;
   means for partitioning said plurality of reference biometric models into M subsets;
   means for computing a distance between said temporary biometric model and each of said reference biometric models in said M subsets and, for each of said M subsets, identifying the reference biometric model which is closest to said temporary biometric model based on said computed distances; and
   means for constructing a compressed biometric model for said user, wherein the compressed biometric model comprises a pattern of parameters, wherein the pattern of parameters comprises identity parameters corresponding to said closest reference models from said M subsets.

2. The system of claim 1, wherein said pattern of parameters comprises a pattern $[I(M_1), \ldots I(M_j)]$, where I is said identity of the closest reference model in the corresponding $M_j^{th}$ subset.

3. The system of claim 1, wherein said pattern of parameters further comprises distance parameters corresponding to said computed distance between said identified closest reference models and said temporary biometric model.

4. The system of claim 3, wherein said pattern of parameters comprises a pattern $\{I(M_1, D(M_1)), \ldots I(M_j, D(M_j))\}$ where I represents said identity of the closest reference model in the corresponding $M_j^{th}$ subset of said M subsets and $D(M_j)$ represents said computed distance between said closest reference model in the corresponding $M_j^{th}$ subset and said temporary biometric model.

5. The system of claim 1, wherein said computing means identifies and ranks R closest reference models in each corresponding one of said M subsets, and wherein said pattern of parameters further comprises ranking parameters corresponding to said ranking of each of said R closest reference models.

6. The system of claim 5, wherein said pattern of parameters comprises a pattern $\{[I(M_1, R_1), \ldots I(M_1, R_i)], \ldots, [I(M_j, R_1), \ldots I(M_j, R_i)]\}$, where I is said identity of the $R_i^{th}$ closest reference model in the corresponding $M_j^{th}$ subset of said plurality of M subsets.

7. The system of claim 5, wherein said pattern of parameters further comprises distance parameters corresponding to said computed distance between each of said R closest models and said temporary biometric model.

8. The system of claim 7, wherein said pattern of parameters comprises a pattern $\{[I(M_1, R_1, D(M_1, R_1)), \ldots I(M_1, R_i, D(M_1, R_i))], \ldots, [I(M_j, R_1, D(M_j, R_1)), \ldots, I(M_j, R_i, D(M_j, R_i))]\}$, where I represents said identity of the $R_i^{th}$ closest reference model in the corresponding $M_j^{th}$ subset of said plurality of M subsets and D represents said corresponding computed distance.

9. The system of claim 1, wherein said system is a text-independent speaker recognition system.

10. The system of claim 1, wherein said compressed biometric model is used as one of an encryption key, a decryption key, and a combination thereof.

11. The system of claim 1, further comprising:
   means for storing a plurality of said compressed biometric models; and
   means for comparing said stored compressed biometric models with a temporary compressed biometric model of a person during an identification and verification phase of said system, said temporary compressed biometric model being constructed by said constructing means, whereby said person will be identified if said comparison means finds a match between said temporary compressed biometric model and one of said stored compressed biometric models.

12. A method for building compressed biometric models in a biometric system, comprising the steps:
   generating a plurality of reference biometric models;
   partitioning said plurality of reference biometric models into M subsets;
   generating a temporary biometric model for a user of said biometric system;
   computing a distance between said temporary biometric model and each of said reference biometric models in said M subsets;
   identifying the reference biometric model in each of said M subsets which is closest to said temporary biometric model based on said computed distances; and
   constructing a compressed biometric model for said user, wherein the compressed biometric model comprises a pattern of parameters, wherein the pattern of parameters comprises identity parameters corresponding to said closest reference models from said M subsets.

13. The method of claim 12, wherein said pattern of parameters comprises a pattern $[I(M_1), \ldots I(M_j)]$, where I is said identity of the closest reference model in the corresponding $M_j^{th}$ subset.

14. The method of claim 12, wherein said pattern of parameters further comprises distance parameters corresponding to said computed distance between said identified closest reference models and said temporary biometric model.

15. The method of claim 14, wherein said pattern of parameters comprises a pattern $\{I(M_1, D(M_1)), \ldots I(M_j, D(M_j))\}$ where I represents said identity of the closest reference model in the corresponding $M_j^{th}$ subset of said M subsets and $D(M_j)$ represents said computed distance between said closest reference model in the corresponding $M_j^{th}$ subset and said temporary biometric model.

16. The method of claim 12, further comprising the steps of:

ranking the reference models in each corresponding one of said M subsets in accordance with the closeness of said reference models to the temporary biometric model, wherein said pattern of parameters further comprises ranking parameters corresponding to said ranking of said reference models in each of said M subsets.

17. The method of claim 16, wherein said pattern of parameters comprises a pattern $\{[I(M_1, R_1), \ldots I(M_1, R_i)], \ldots, [I(M_j, R_1), \ldots I(M_j, R_i)]\}$, where I is said identity of an $R_i^{th}$ closest reference model in the corresponding $M_j^{th}$ subset of said plurality of M subsets.

18. The system of claim 5, wherein R is a programmable parameter.

19. The method of claim 16, wherein said pattern of parameters further comprises distance parameters corresponding to said computed distance between said identified and ranked reference models and said temporary biometric model.

20. The method of claim 19, wherein said pattern of parameters comprises a pattern $\{[I(M_1, R_1, D(M_1, R_1)), \ldots I(M_1, R_i, D(M_1, R_i))], \ldots, [I(M_j, R_1, D(M_j, R_1)), \ldots, I(M_j, R_i, D(M_j, R_i))]\}$, where I represents said identity of the $R_i^{th}$ closest reference model in the corresponding $M_j^{th}$ subset of said plurality of M subsets and D represents said corresponding computed distance.

21. The method of claim 12, further comprising the steps of:

storing a plurality of said compressed biometric models; and generating a temporary compressed biometric model of an individual making an identity claim;

comparing said stored compressed biometric models with said temporary compressed biometric model; and verifying the identity of said individual if a match if found between said temporary compressed biometric model and one of said stored compressed biometric models.

22. A program storage device readable by machine, tangibly embodying a program of instructions executable by the machine to perform method steps for building compressed biometric models in a biometric system, the method steps comprising:

generating a plurality of reference biometric models;

partitioning said plurality of reference biometric models into M subsets;

generating a temporary biometric model for a user of said biometric system;

computing a distance between said temporary biometric model and each of said reference biometric models in said M subsets;

identifying the reference biometric model in each of said M subsets which is closest to said temporary biometric model based on said computed distances; and constructing a compressed biometric model for said user, wherein the compressed biometric model comprises a pattern of parameters, wherein the pattern of parameters comprises identity parameters corresponding to said closest reference models from said M subsets.

23. The program storage device of claim 22, wherein said pattern of parameters comprises a pattern $[I(M_1), \ldots I(M_j)]$, where I is said identity of the closest reference model in the corresponding $M_j^{th}$ subset.

24. The program storage device of claim 22, wherein said pattern of parameters further comprises distance parameters corresponding to said computed distance between said identified closest reference models and said temporary biometric model.

25. The program storage device of claim 24, wherein said pattern of parameters comprises a pattern $\{I(M_1, D(M_1)), \ldots I(M_j, D(M_j))\}$ where I represents said identity of the closest reference model in the corresponding $M_j^{th}$ subset of said M subsets and $D(M_j)$ represents said computed distance between said closest reference model in the corresponding $M_j^{th}$ subset and said temporary biometric model.

26. The program storage device of claim 22, further comprising instructions for performing the step of ranking the reference models in each corresponding one of said M subsets in accordance with the closeness of said reference models to the temporary biometric model, wherein said pattern of parameters further comprises ranking parameters corresponding to said ranking of said reference models in each of said M subsets.

27. The program storage device of claim 26, wherein said pattern of parameters comprises a pattern $\{[I(M_1, R_1), \ldots I(M_1, R_i)], \ldots, [I(M_j, R_1), \ldots I(M_j, R_i)]\}$, where I is said identity of an $R_i^{th}$ closest reference model in the corresponding $M_j^{th}$ subset of said plurality of M subsets.

28. The program storage device of claim 26, wherein said pattern of parameters further comprises distance parameters corresponding to said computed distance between said identified and ranked reference models and said temporary biometric model.

29. The program storage device of claim 28, wherein said pattern of parameters comprises a pattern $\{[I(M_1, R_1, D(M_1, R_1)), \ldots I(M_1, R_i, D(M_1, R_i))], \ldots, [I(M_j, R_1, D(M_j, R_1)), \ldots, I(M_j, R_i, D(M_j, R_i))]\}$, where I represents said identity of the $R_i^{th}$ closest reference model in the corresponding $M_j^{th}$ subset of said plurality of M subsets and D represents said corresponding computed distance.

* * * * *